United States Patent
Scales et al.

(10) Patent No.: US 6,289,443 B1
(45) Date of Patent: *Sep. 11, 2001

(54) SELF-PRIMING LOOP EXECUTION FOR LOOP PROLOG INSTRUCTION

(75) Inventors: Richard H. Scales; Natarajan (Nat) Seshan, both of Houston, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/238,259

(22) Filed: Jan. 27, 1999

Related U.S. Application Data

(60) Provisional application No. 60/072,905, filed on Jan. 28, 1998.

(51) Int. Cl.⁷ .............................. G06F 9/38; G06F 9/30; G06F 17/10
(52) U.S. Cl. .............................. 712/241; 712/241; 717/9; 708/300
(58) Field of Search .............................. 708/300; 712/241, 712/239, 240; 717/9

(56) References Cited

U.S. PATENT DOCUMENTS

| | | | |
|---|---|---|---|
| 5,083,267 | * 1/1992 | Rau et al. | 712/241 |
| 5,386,562 | * 1/1995 | Jain et al. | 717/9 |
| 5,983,253 | * 11/1999 | Fischer et al. | 708/300 |

OTHER PUBLICATIONS

Vicki H. Allan, et al.; *Software Pipelining*, ACM Computing Surveys, vol. 27, No. 3, Sep. 1995, pp. 367–432.

Texas Instruments Incorporated, Digital Signal Processing Solutions; TMS320C62x/C67x—Programmer's Guide, 1998, entire guide.

Texas Instruments Incorporated, Digital Signal Processing Solutions: TMS320C62x/C67x—CPU and Instruction Set—Reference Guide, 1998, entire guide.

* cited by examiner

*Primary Examiner*—Daniel H. Pan
*Assistant Examiner*—Te Yu Chen
(74) *Attorney, Agent, or Firm*—Robert D. Marshall, Jr.; W. James Brady, III; Frederick J. Telecky, Jr.

(57) ABSTRACT

A method of operating a multiple execution unit microprocessor in a software pipelined loop is disclosed. This method executes the loop body before the pipeline is fully initialized, thus replacing prolog instructions with additional loop iterations. The method has the potential to greatly reduce prolog size for many software pipelined loops. As a further aspect of the method, the loop results are insulated from any deleterious effects of loop body execution prior to full initialization—methods for accomplishing this are disclosed, including array overallocation, conditional execution of some loop body instructions, and register initialization.

12 Claims, 3 Drawing Sheets

SELF-PRIMING LOOP EXECUTION FOR LOOP PROLOG INSTRUCTION

This application claims priority under 35 USC §119(e)(1) of Provisional Application No. 60/072,905, filed Jan. 28, 1998.

FIELD OF THE INVENTION

The present invention pertains generally to the operation of pipelined microprocessors, and pertains more particularly to methods usable on such microprocessors for executing software pipelined loops.

BACKGROUND OF THE INVENTION

A microprocessor is a circuit that combines the instruction-handling, arithmetic, and logical operations of a computer on a single chip. A digital signal processor (DSP) is a microprocessor optimized to handle large volumes of data efficiently. Such processors are central to the operation of many of today's electronic products, such as high-speed modems, high-density disk drives, digital cellular phones, and complex automotive systems, and will enable a wide variety of other digital systems in the future. The demands placed upon DSPs in these environments continue to grow as consumers seek increased performance from their digital products.

Designers have succeeded in increasing the performance of DSPs generally by increasing clock frequencies, by removing architectural bottlenecks in DSP circuit design, by incorporating multiple execution units on a single processor circuit, and by developing optimizing compilers that schedule operations to be executed by the processor in an efficient manner. As further increases in clock frequency become more difficult to achieve, designers have embraced the multiple execution unit processor as a means of achieving enhanced DSP performance. For example, FIG. 1 shows a block diagram of a DSP execution unit and register structure having eight execution units, L1, S1, M1, D1, L2, S2, M2, and D2. These execution units operate in parallel to perform multiple operations, such as addition, multiplication, addressing, logic functions, and data storage and retrieval, simultaneously.

Theoretically, the performance of a multiple execution unit processor is proportional to the number of execution units available. However, utilization of this performance advantage depends on the efficient scheduling of operations so that most of the execution units have a task to perform each clock cycle. Efficient scheduling is particularly important for looped instructions, since the processor will typically spend the majority of its time in loop execution.

One effective way in which looped instructions can be arranged to take advantage of multiple execution units is with a software pipelined loop. In a conventional scalar loop, all instructions execute for a single iteration before any instructions execute for following iterations. In a software pipelined loop, the order of operations is rescheduled such that one or more iterations of the original loop begin execution before the preceding iteration has finished.

Referring to FIG. 2a, a simple loop containing 7 iterations of the operations A, B, and C is shown. FIG. 2b depicts an alternative execution schedule for the loop of FIG. 2a, where a new iteration of the original loop is begun each clock cycle. For clock cycles $I_3$–$I_7$, the same instruction ($A_n, B_{n-1}, C_{n-2}$) is executed each clock cycle in this schedule; if multiple execution units are available to execute these operations in parallel, the code can be restructured to perform this repeated instruction in a loop. The repeating pattern of A,B,C (along with loop control operations) thus forms the loop kernel of a new, software pipelined loop that executes the instructions at clock cycles $I_3$–$I_7$ in 5 loops. FIG. 2c depicts such a loop. The instructions executed at clock cycles $I_1$ and $I_2$ of FIG. 2b must still be executed first in order to properly "fill" the software pipelined loop; these instructions are referred to as the loop prolog. Likewise, the instructions executed at clock cycles $I_8$ and $I_9$ of FIG. 2b must still be executed in order to properly "drain" the software pipeline; these instructions are referred to as the loop epilog. Note that in many situations the loop epilog may be deleted through a technique known as speculative execution.

The simple example of FIGS. 2a–2c illustrates the basic principles of software pipelining, but other considerations such as dependencies and conflicts may constrain a particular scheduling solution. For an explanation of software pipelining in more detail, see Vicki H. Allen, *Software Pipelining*, 27 ACM Computing Surveys 367 (1995).

SUMMARY OF THE INVENTION

One disadvantage of software pipelining is the need for a specialized loop prolog for each loop. The loop prolog explicitly sequences the initiation of the first several iterations of a pipeline, adding instructions each clock cycle until the steady-state loop kernel can be entered. This is commonly called "filling" the pipeline. Steady-state operation is achieved once every instruction in the loop kernel will have valid operands if the kernel is executed. As a rule of thumb, the loop kernel can be executed in steady state after k=1−m clock cycles, where 1 represents the number of clock cycles required to complete one iteration of the pipelined loop, and m represents the number of clock cycles contained in one iteration of the loop kernel. This formula must generally be modified if the kernel is unrolled.

Given this relationship, it can be appreciated that as the cumulative pipeline delay required by a single iteration of a pipelined loop increases, corresponding increases in loop prolog length are usually observed. In some cases, the loop prolog code required to fill the pipeline may be several times the size of the loop kernel code. Code size can be a determining factor in execution speed. Shorter programs can generally use on-chip program memory to a greater extent than longer programs. Thus long loop prologs can be detrimental to program execution speed.

The present invention seeks to reduce code size by eliminating at least a portion of the loop prolog required by prior art software pipelining. The present invention accomplishes this by "self-priming"; i.e., the processor executes the loop kernel for additional iterations in lieu of executing separate prolog code. Of course, the elimination of instructions necessary to fill the pipeline from the prolog does not remove the necessity of the instructions themselves. These instructions are repeated in the loop body and can be executed there.

One problem with utilizing the loop body instructions to prime the loop is that many loop instructions would have invalid operands if the loop is executed without a prolog. Thus the invention implies that one or more steady-state loop operations may be executed prematurely, i.e., before the pipeline reaches steady state, while the loop is "self-priming". For purposes of this disclosure, an operation executes prematurely if valid data needed to perform the operation in steady-state operation is not yet available through the pipeline. Because premature operations typically produce nonsensical results, and potentially produce results harmful to the ultimate loop result, the present invention also provides several methods for preventing premature loop operations from altering the desired loop result.

In one aspect, the present invention provides a method for operating a processor in a software pipelined loop that eliminates the need for at least part of a loop prolog. Generally, this method comprises sequencing the processor through a desired number of iterations of a software pipelined loop kernel. However, this method further comprises the sequencing of at least one additional iteration of the software pipelined loop kernel through the processor before the pipeline reaches steady-state operation, while insulating the loop results from deleterious effects of the additional iteration. The additional iteration thus may advantageously be used to replace a portion of the loop prolog, typically resulting in shorter code size.

Several general methods are disclosed for insulating loop results from deleterious effects of additional iterations. A first method is output array over allocation. An output array is padded with additional adjacent memory locations such that premature store operations write (potentially nonsensical) output to valid memory locations. A second method is register presetting. A register used by a prematurely executing instruction is preset such that premature execution of the instruction produces a result harmless to the loop results. A third method is instruction conditioning. A kernel instruction that would otherwise execute prematurely is conditioned on a counter that tracks kernel iterations, such that the instruction is prevented from executing during loop priming kernel iterations. Combinations of these methods can also be employed.

In a related aspect of the invention, a method of rescheduling execution of a software pipelined loop is provided. This method comprises constructing a loop kernel having a loop counter; adjusting the loop counter initial value such that at least one additional iteration of the loop is performed; placing the loop kernel in an execution order such that it begins execution before the pipeline is completely initialized; determining which execution units will as a result receive pipeline instructions before receiving valid pipeline data; and insulating loop results from the harmful effects of such instructions.

BRIEF DESCRIPTION OF THE DRAWINGS

The invention may be best understood with reference to the drawing, wherein.

DETAILED DESCRIPTION OF THE PREFERRED EMBODIMENTS

Several illustrative embodiments are described herein for the present invention. Although it is believed that the present invention may be utilized in conjunction with virtually any processor having multiple execution units, for illustrative purposes the detailed embodiments are described with reference to a specific processor family, the Texas Instruments TMS320C62xx. Those of ordinary skill in the pertinent art should comprehend the description below in sufficient detail to enable them to reproduce the invention, however, for specific data related to processor architecture, instruction set, and operation, the interested reader is referred to the Texas Instruments TMS320C62x/67x CPU and Instruction Set Reference Guide 1998 and the Texas Instruments TMS320C62x/C67x Programmer's Guide 1998, which are incorporated herein by reference.

Figures 2A, 2B, 2C:
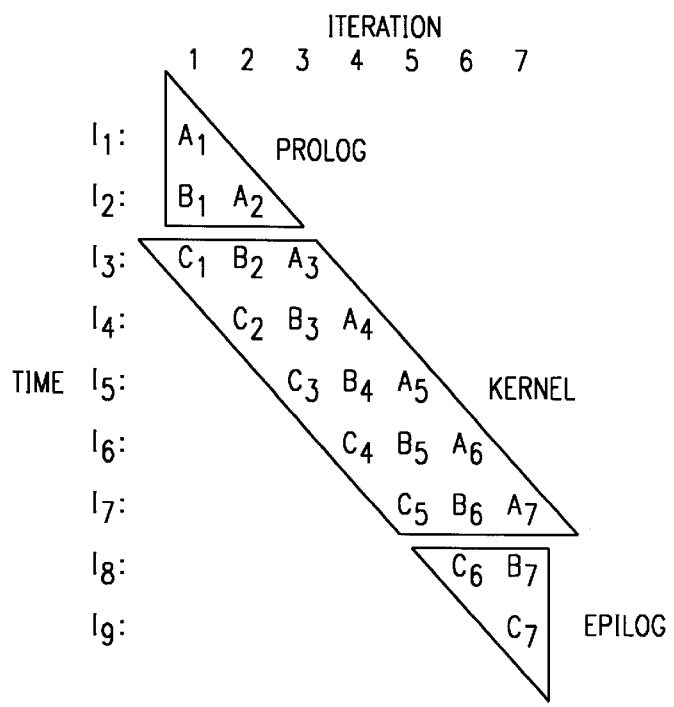
FIG. 2a depicts a simple scalar loop of computer instructions.
FIGS. 2b and 2c, respectively, depict an alternate execution schedule for the scalar loop of FIG. 2a and a new software pipelined loop based on this execution schedule.
Figure 3A:
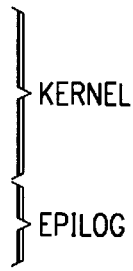
FIGS. 3a, 3b, 3c, 3d, 3e, and 3f illustrate various rescheduled loops according to the present invention.

Referring again to the Example of FIGS. 2a–2c, the invention will first be explained conceptually. In a first embodiment shown in FIG. 3a, the prolog of FIG. 2c is completely eliminated by executing the loop kernel two additional times and adjusting the instruction indexes accordingly. It can be readily observed that a processor executing the loop of FIG. 3a will execute all the operations of the original scalar loop of FIG. 2a. Note, however, that when a processor executes the loop of FIG. 3a, several indexed operations are performed that did not exist in the original scalar loop of FIG. 2a, namely $B_0$, $C_{-1}$, and $C_0$. This embodiment assumes that such instructions execute harmlessly. For instance, if instruction B performs a mathematical operation and instruction C stores the result of B to an array a[1:7], array a could instead be allocated as a[−1:7]. Alternatively, an equivalent indexing scheme could be used with different endpoints. Although the values stored by the new loop in locations a[−1] and a[0] would be nonsensical, because valid operands are never used for those locations, these values would be harmless to the desired result stored in a[1:7].

Figure 3D:
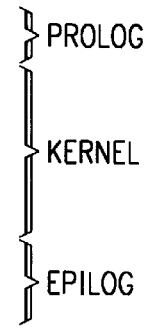
Figure 3B:
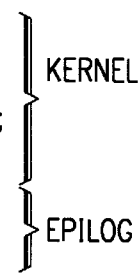

A second embodiment according to the invention is shown in FIG. 3b. This embodiment assumes that premature execution of instructions B and C is undesirable, but that the processor can execute instructions B and C conditionally without loss of speed. Thus, the first time through the loop of FIG. 3b (i=1), neither B nor C will execute, and the second time through the loop (i=2), instruction C will not execute.

Figure 3E:
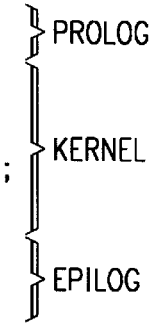
Figure 3C:
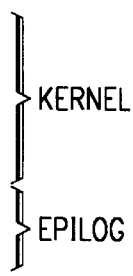

Note that the first and second embodiments may also be combined to form yet another embodiment. As shown in FIG. 3c, B is allowed to execute prematurely and C is made conditional. This can be useful, for instance, if B produces a harmless intermediate result and C writes to memory.

An additional embodiment is shown in FIG. 3d. In this embodiment, B and C are allowed to execute prematurely, but the initial value of their operands is set so as to produce a harmless result. For instance, a register $R_1$ is initialized to a constant value c prior to loop execution. If B uses $R_1$, e.g., as. an operand in a multiply operation, and C accumulates the result of B, setting $R_1$ to a constant value of 0 insures that premature operations do not affect the accumulated result. Although this method requires one or more initialization instructions that are not required by the prior art approach, in many cases it still results in a code size smaller than the prior art prolog approach.

In addition to combinations of the methods of the prior embodiments, an embodiment does not necessarily require that a conventional prolog be entirely eliminated. It is recognized herein that prologs generally are bottom-heavy, i.e., as the pipeline is filled, more prolog instructions are executed at each clock cycle. Thus, maximum benefit may be gained in some cases by eliminating only the latter part of a prolog. FIG. 3e depicts an embodiment wherein $A_1$ is executed in a prolog, but the prolog instruction $A_2$, $B_1$ of FIG. 2c is eliminated. In this loop, the only premature operation appearing during execution is $C_0$, and yet two-thirds of the prolog instructions have been eliminated.

Figure 3F:
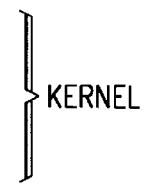

The present invention may also be utilized in combination with speculative execution to further reduce code size. As mentioned previously, speculative execution reduces code size by elimination of a software pipeline loop epilog. The software pipelined loop embodiment depicted in FIG. 3f illustrates this idea: the loop executes nine times, such that instruction A is executing beyond the iteration range of FIG. 2a on iterations 8 and 9, and B is executing beyond this range on iteration 9. Despite the extra iterations, this loop has the smallest code size, and should require no more clock cycles than the loop of FIG. 2c.

Figure 1:
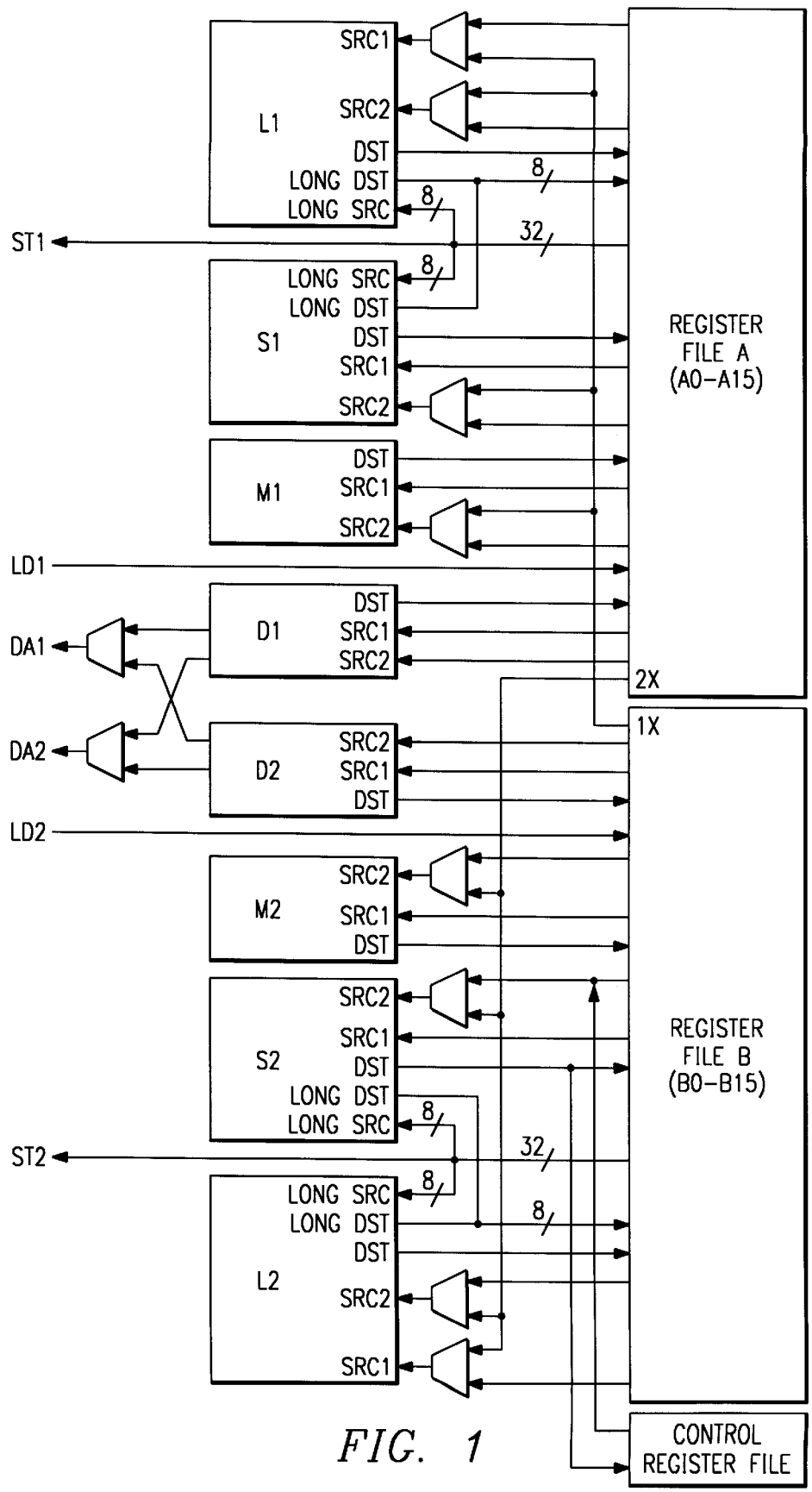
FIG. 1 is a block diagram depicting the execution units and registers of a multiple-execution unit processor.

The invention will now be described using embodiments that operate on an eight execution unit processor such as the one depicted in FIG. 1, e.g., the TMS320C6xx processor. The examples below implement a software pipelined dot product of two arrays a[1] and b[i] for I=600. The embodiments below complete more than one iteration per loop. Although the complexity of a software pipelined loop benefitting from the present invention may be much greater than the complexity of a dot product, this function was chosen for its simplicity such that the invention may be readily discerned in the examples.

Comparative Code Example 1 below illustrates a simple software pipelined loop implementation of the dot product. This implementation comprises a prolog and a single-instruction loop kernel that performs operations on all eight processors. The || symbol indicates operations that execute in parallel with an immediately preceding operation. Note that this implementation uses speculative execution, and thus contains no loop epilog. Because the multiply (MY and MPH), branch (B), and load operations (LAW) in this loop all operate with delay slots, the registers are multiply-assigned. This following implementations assume that the arrays to be multiplied are large enough that the loop counter need not be checked in the prolog itself.

Comparative Code Example 1

```
_dotp:
;*------------------------------------------------------------------*
L2:         ; PIPED LOOP PROLOG
            LDW     .D2     *B7+ +,B6       ; load ai & ai+1 from memory
||          LDW     .D1     *A3+ +,A4       ; load bi & bi+1 from memory
            MVK     .S2     0x120,B0        ; cntr = 600/2
||          LDW     .D2     *B7+ +,B6       ;@ load ai & ai+1 from memory
||          LDW     .D1     *A3+ +,A4       ;@ load bi & bi+1 from memory
||          ZERO    .L1     A0              ; multiply result = 0
||          ZERO    .L2     B5              ; multiply result = 0
            B       .S1     L3              ; branch to loop
||          LDW     .D2     *B7+ +,B6       ;@@ load ai & ai+1 from memory
||          LDW     .D1     *A3+ +,A4       ;@@ load bi & bi+1 from memory
            B       .S1     L3              ;@ branch to loop
||          LDW     .D2     *B7+ +,B6       ;@@@ load ai & ai+1 from memory
||          LDW     .D1     *A3+ +,A4       ;@@@ load bi & bi+1 from memory
            B       .S1     L3              ;@@ branch to loop
||          LDW     .D2     *B7+ +,B6       ;@@@@ load ai & ai+1 from memory
||          LDW     .D1     *A3+ +,A4       ;@@@@ load bi & bi+1 from memory
            MPY     .M2X    B6,A4,B4        ; ai * bi
||          MPYH    .M1X    B6,A4,A5        ; ai+1 * bi+1
            B       .S1     L3              ;@@@ branch to loop
||          LDW     .D2     *B7+ +,B6       ;@@@@@ load ai & ai+1 from memory
||          LDW     .D1     *A3+ +,A4       ;@@@@@ load bi & bi+1 from memory
            MPY     .M2X    B6,A4,B4        ;@ ai * bi
||          MPYH    .M1X    B6,A4,A5        ;@ ai+1 * bi+1
            B       .S1     L3              ,@@@@ branch to loop
||          LDW     .D2     *B7+ +,B6       ;@@@@@@ load ai & ai+1 from memory
||          LDW     .D1     *A3+ +,A4       ;@@@@@@ load bi & bi+1 from memory
;** ------------------------------------------------------------------*
L3:         ; PIPED LOOP KERNEL
            ADD     .L2     B4,B5,B5        ; sum0 += (ai * bi)
||          ADD     .L1     A5,A0,A0        ; sum1 += (ai+1 * bi+1)
||          MPY     .M2X    B6,A4,B4        ;@@ ai * bi
||          MPYH    .M1X    B6,A4,A5        ;@@ ai+1 * bi+1
||[ B0]     B       .S1     L3              ;@@@@@ branch to loop
||[ B0]     SUB     .S2     B0,0x1,B0       ;@@@@@@ decrement loop counter
||          LDW     .D2     *B7+ +,B6       ;@@@@@@@ load ai & ai+1 from memory
||          LDW     .D1     *A3+ +,A4       ;@@@@@@@ load bi & bi+1 from memory
;** ------------------------------------------------------------------*
L4:         ; PIPED LOOP EPILOG
            ; REMOVED
;** ------------------------------------------------------------------*
            ; Branch occurs here
            ADD     .L1X    B5,A0,A4        ; sum = sum0 + sum1
```

The code example above requires 26 prolog instructions and 8 kernel instructions, as contrasted with the following Example 1 according to the present invention, which requires only 12 prolog instructions and 8 kernel instructions. Although over half of the prolog instructions have been eliminated in Example 1, a 5-cycle prolog is still required in this embodiment, primarily because of the 5-cycle branch latency and the single-cycle loop body. To prevent execution order from falling through the loop due to branch latency, the single-cycle loop body cannot be entered until the first branch is imminent. As will be shown in Example 2, longer loop bodies may allow some or all of these branches to be internalized to the loop itself. It should be further noted that the loop counter has been adjusted upwards by six, as all loads now occur within the loop body.

the first five loop iterations, the multiply and accumulate operations execute harmlessly because their operand registers are set to zero.

Example 2 shows an alternative embodiment for a self-priming dot product loop. This loop requires only 6 prolog instructions as opposed to 12 for Example 1, but the loop body has increased from 8 to 15 instructions. The total

EXAMPLE 1

```
_dotp:
;*------------------------------------------------------------------*
L2:        ; PIPED LOOP PROLOG
           B       .S2    LOOP            ; branch to loop
||         MVK     .S1    0x258,A1        ; 600/2 iterations + 6 to pipe up
           B       .S2    LOOP            ;* branch to loop
           B       .S2    LOOP            ;** branch to loop
||         ZERO    .L1    A7              ; zero out sum0 accumulator
||         ZERO    .L2    B7              ; zero out sum1 accumulator
           B       .S2    LOOP            ;*** branch to loop
||         ZERO    .L1    A6              ; zero out add input
||         ZERO    .L2    B6              ; zero out add input
           B       .S2    LOOP            ;**** branch to loop
||         ZERO    .L1    A2              ; zero out mpy input
||         ZERO    .L2    B2              ; zero out mpy input
;**------------------------------------------------------------------*
L3:        ; PIPED LOOP KERNEL
LOOP:
           ADD     .L1    A6,A7,A7        ; sum0 += (ai * bi)
||         ADD     .L2    B6,B7,B7        ; sum1 += (ai+1 * bi+1)
||         MPY     .M1X   A2,B2,A6        ;** ai * bi
||         MPYH    .M2X   A2,B2,B6        ;** ai+1 * bi+1
|| [ A1]   ADD     .S1    -1,A1,A1        ;****** decrement loop counter
|| [ A1]   B       .S2    LOOP            ;***** branch to loop
||         LDW     .D1    *A4++,A2        ;******* ld ai & ai+1 from memory
||         LDW     .D2    *B4++,B2        ;******* ld bi & bi+1 from memory
;**------------------------------------------------------------------*
L4:        ; PIPED LOOP EPILOG
           ; REMOVED
;**------------------------------------------------------------------*
           ; Branch occurs here
           ADD     .L1X   B7,A7,A4        ; sum = sum0 + sum1
```

Example 1 also illustrates one method for avoiding deleterious effects of prolog elimination. The embodiment includes setup instructions to zero out registers used by the multiply operation (registers A2 and B2) and by the accumulate operation (registers A6 and B6) of the dot product loop. Although no valid data is loaded from memory during number of instructions is 21, only one more than the total for Example 1. The reason for the increase in the loop body code size will become evident shortly.

EXAMPLE 2

```
_dotp:
;*------------------------------------------------------------------*
L2:        ; PIPED LOOP PROLOG
           B       .S2    LOOP            ; branch to loop
           MVK     .S1    0x9A,A1         ; 600/4 iterations + 4 to pipe up
           B       .S2    LOOP            ;** branch to loop
||         ZERO    .L1    A7              ; zero out sum0 accumulator
||         ZERO    .L2    B7              ; zero out sum1 accumulator
           MVK     .S1    0x4,A0          ; initialize pipeup counter
;**------------------------------------------------------------------*
L3:        ; PIPED LOOP KERNEL
LOOP:
  [!A0]    ADD     .L1    A6,A7,A7        ;* sum0 += (ai * bi)
|| [!A0]   ADD     .L2    B6,B7,B7        ;* sum1 += (ai+1 * bi+1)
||         MPY     .M1X   A3,B3,A5        ;** ai * bi
||         MPYH    .M2X   A3,B3,B5        ;** ai+1 * bi+1
|| [!A1]   ADD     .S1    -1,A1,A1        ; decrement loop counter
|| [!A1]   B       .S2    LOOP            ; branch to loop
||         LDW     .D1    *-A4(4),A2      ;* ld ai & ai+1 fm memory
||         LDW     .D2    *-B4(4),B2      ;* ld bi & bi+1 fm memory
```

-continued

```
[!A0]    ADD    .L1    A5,A7,A7       ;** sum0 += (ai * bi)
|| [!A0] ADD    .L2    B5,B7,B7       ;** sum1 += (ai+1 * bi+1)
||       MPY    .M1X   A2,B2,A6       ;* ai * bi
||       MPYH   .M2X   A2,B2,B6       ;* ai+1 * bi+1
|| [!A0] ADD    .S1    -1,A0,A0       ; decrement pipeup counter
||       LDW    .D1    *A4++(8),A3    ; ** ld ai & ai+1 fm memory
||       LDW    .D2    *B4++(8),B3    ;** ld bi & bi+1 fm memory
;** ------------------------------------------------------------------*
L4:             ; PIPED LOOP EPILOG
                ; REMOVED
;** ------------------------------------------------------------------*
                ; Branch occurs here
                ADD    .L1X   B7,A7,A4    ; sum =sum0 +sum1
```

Example 2 differs from Example 1 in that no effort is made to preset the contents of registers that will be utilized prematurely. Instead, a conditional register (A0) is initialized to a non-zero countdown value, and the accumulate operations are conditioned upon register A0 having a value of zero. An instruction is added to the loop kernel for the purpose of decrementing this register until it reaches a value of zero. Thus, this register is a "pipeup" counter; it counts iterations through the loop until the loop has self-primed. In this particular embodiment, once the loop is primed, the counter will freeze at zero, enabling the accumulate operation for all further kernel iterations.

Example 2 has several requirements that may determine whether it is an effective alternative in a given case. First, this approach generally requires that a register be dedicated to the "pipeup" counter for the duration of loop execution. If register pressure is high, this may not be feasible. Second, this approach generally requires that an execution slot be available in the loop body for decrementing the pipeup counter. If all arithmetic units are in use, this method may require an expansion of the loop body. Such is the case in Example 2. The loop was unrolled to perform twice as many iterations per loop, such that an execution slot was available to decrement the counter. Of course, if instructions on a given processor can be conditioned on a value other than zero, the loop counter itself could be used to "flip the switch" on operations as their operands became valid.

As can be appreciated from the examples above, significant code size savings can be realized by utilization of the present invention. Excluding those instructions required for initialization in any dot product implementation (i.e., loop counter and accumulator initialization), Comparative Code Example 1 requires 31 instructions, Example 1 requires 17 instructions, and Example 2 requires 18 instructions. For the dot product implementation of Comparative Code Example 1, the illustrated embodiments reduce the code size required for reschedulable operations by 42% to 45%, The primary expense for this reduction is generally a slight increase in the number of clock cycles required for loop execution, although this expense may be minimal if the loop requires significant parameter initialization, such that branches can be begun earlier in parallel with parameter initialization. Code size reduction allows more code to be retained in on-chip memory. Thus even the elimination of one off-chip instruction fetch by the present invention may compensate for the few extra clock cycles the method may require during execution.

Given the above description, those skilled in the compiler art should be able to readily incorporate the present invention into an automated compiler. Such a compiler should preferably be able to separate permanent and transitory results of a desired loop, and take steps such as those disclosed herein to protect permanent results from the effects of premature execution of some loop body instructions. The identification of those instructions that execute prematurely can generally be accomplished using prior art logic that identifies dependencies (e.g. for generating conventional prolog code). The compiler must also recognize that a loop counter must be adjusted to account for self-priming cycles of the loop kernel, and then adjust the counter appropriately. Finally, such a compiler must place the loop kernel in an execution order such that it begins execution at an appropriate point before the pipeline is completely initialized.

Although the invention has been described herein with reference to a specific processor, it is recognized that one of ordinary skill can readily adapt the described embodiments to operate on other multiple execution unit processors. Likewise, the use of the dot product is illustrative and not limiting. It is recognized that the invention may be readily practiced with software pipelined loops generally. And although the preferred embodiments have been described with reference to several specific methods for protecting loop results from premature operations, one of ordinary skill in the art may readily substitute other similar methods that are applicable to a specific microprocessor in an embodiment of the invention. Other obvious modifications will be apparent to those of ordinary skill in the art upon reading this disclosure; such are intended to fall within the scope of the present invention.

What is claimed is:

1. A method of operating a processor having multiple execution units in a pipelined loop to produce a first result, said method comprising the steps of:
   executing on said processor a first number of iterations of a pipelined loop kernel in steady-state pipeline operation; and
   executing on said processor at least one self-priming iteration of said loop kernel prior to said processor reaching steady-state pipeline operation and immediately prior to said step of executing said first number of iterations of said loop kernel.

2. The method of claim 1, further comprising insulating said first result from any deleterious effects of said step of executing at least one self-priming iteration of said loop kernel.

3. The method of claim 2, wherein said insulating step comprises overallocating an output array, thereby providing valid memory locations for use by a store instruction executing prematurely during said step of executing at least one self-priming iteration of said loop kernel.

4. The method of claim 2, wherein said insulating step comprises conditioning execution of at least one instruction executing during said step of executing at least one self-priming iteration of said loop kernel upon a counter reaching a first value, executing said at least one instruction if said counter had reached said first value and not executing said at least one instruction if said counter has not reached said first value, said counter initially incrementing or decrementing with each iteration of said loop kernel, wherein said first value indicates that said at least one instruction has operands available for valid pipeline operation.

5. The method of claim 4, wherein said counter is also a loop counter for said loop kernel.

6. The method of claim 4, wherein said counter is a counter dedicated during said step of executing at least one self-priming iteration of said loop kernel for the purpose of preventing premature execution of said at least one instruction.

7. The method of claim 6, wherein said counter is initialized with a value representing a number of self-priming iterations of said loop kernel that are required to reach steady-state operation, and wherein said counter is decremented to and then stops counting at zero.

8. The method of claim 2, wherein said insulating step comprises presetting, prior to said step of executing said at least one self-priming iteration of said loop kernel, at least one register on said processor that is used during said step of executing said at least one self-priming iteration of said loop kernel to a value such that an instruction executing prematurely using said register produces a result harmless to said first result.

9. A method of operating a processor having multiple execution units in a pipelined loop to produce a first result, said method comprising the steps of:

executing on said processor a first number of iterations of a pipelined loop kernel in steady-state pipeline operation;

executing on said processor at least one self-priming iteration of said loop kernel prior to said processor reaching steady-state pipeline operation and immediately prior to said step of executing said first number of iterations of said loop kernel; and insulating said first result from any deleterious effects of said step of executing at least one self-priming iteration of said loop kernel step by overallocating an output array, thereby providing valid memory locations for use by a store instruction executing prematurely during said step of executing at least one self-priming iteration of said loop kernel.

10. The method of claim 1, further comprising executing on said processor at least one prolog instruction immediately prior to said step of executing at least one self-priming iteration of said loop kernel.

11. A method of operating a processor having multiple execution units in a pipelined loop to produce a first result, said method comprising the steps of:

executing on said processor a first number of iterations of a pipelined loop kernel in steady-state pipeline operation;

executing on said processor at least one self-priming iteration of said loop kernel prior to said processor reaching steady-state pipeline operation and immediately prior to said step of executing said first number of iterations of said loop kernel; and insulating said first result from any deleterious effects of said step of executing at least one iteration of said loop kernel step by presetting, prior to said step of executing said at least one self-priming iteration of said loop kernel, at least one register on said processor that is used during said step of executing said at least one self-priming iteration of said loop kernel to a value such that an instruction executing prematurely using said register produces a result harmless to said first result.

12. A method of operating a processor having multiple execution units in a pipelined loop to produce a first result, said method comprising the steps of:

executing on said processor a first number of iterations of a pipelined loop kernel in steady-state pipeline operation;

executing on said processor at least one self-priming iteration of said loop kernel prior to said processor reaching steady-state pipeline operation and immediately prior to said step of executing said first number of iterations of said loop kernel; and insulating said first result from any deleterious effects of said step of executing at least one iteration of said loop kernel step by conditioning execution of at least one instruction executing during said step of executing at least one self-priming iteration of said loop kernel upon a counter reaching a first value, executing said at least one instruction if said counter had reached said first value and not executing said at least one instruction if said counter has not reached said first value, said counter initially incrementing or decrementing with each iteration of said loop kernel, wherein said first value indicates that said at least one instruction has operands available for valid pipeline operation.

* * * * *